Figure 1:
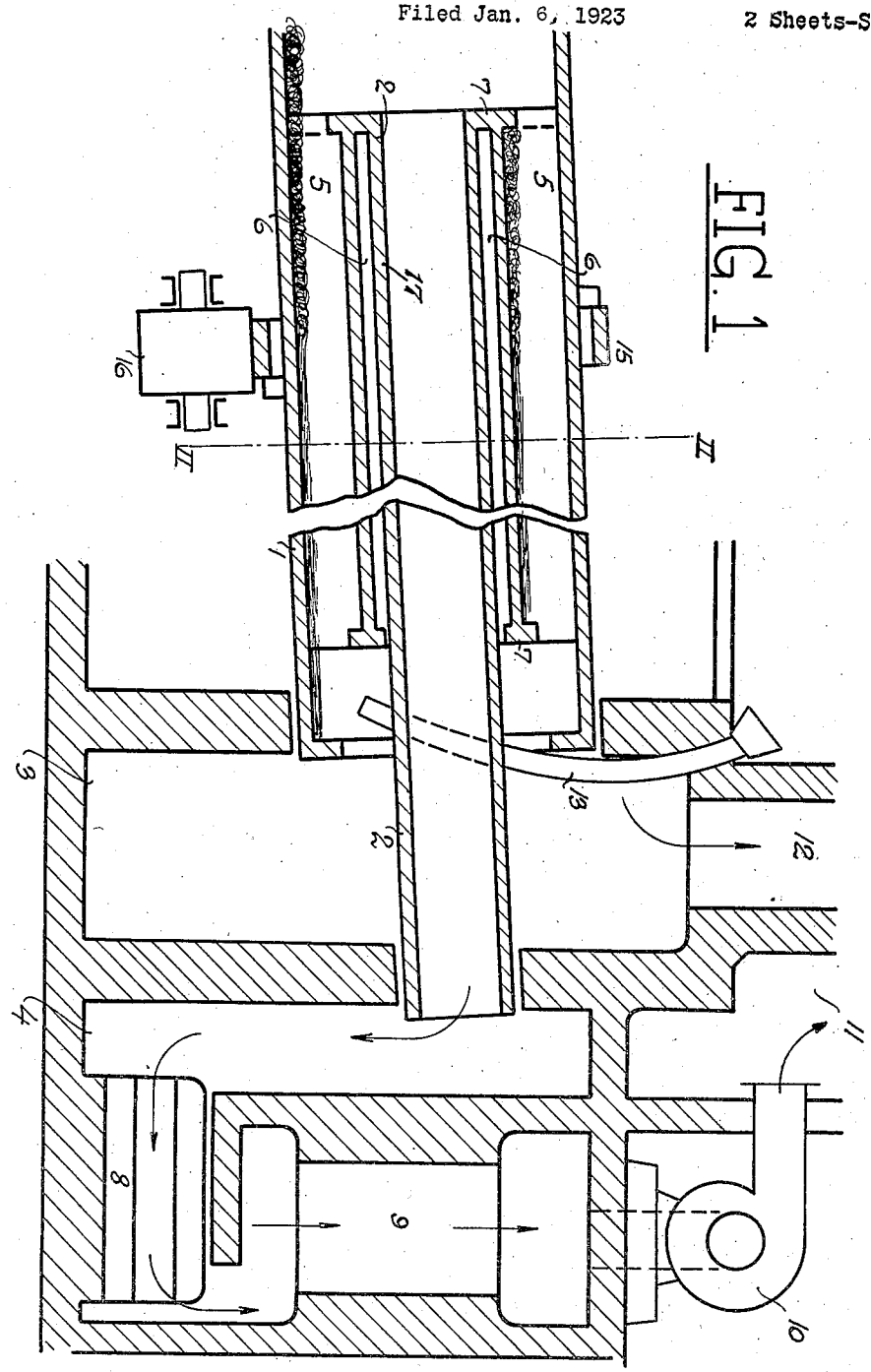

Patented Jan. 8, 1924.

1,480,319

UNITED STATES PATENT OFFICE.

MIKAEL VOGEL-JÖRGENSEN AND KRISTIAN MIDDELBOE, OF FREDERIKSBERG, NEAR COPENHAGEN, DENMARK, ASSIGNORS TO F. L. SMIDTH & CO., OF NEW YORK, N. Y., A CORPORATION OF NEW JERSEY.

ROTARY CEMENT-BURNING KILN.

Application filed January 6, 1923. Serial No. 611,201.

*To all whom it may concern:*

Be it known that we, MIKAEL VOGEL-JÖRGENSEN and KRISTIAN MIDDELBOE, subjects of the King of Denmark, residing at Frederiksberg, near Copenhagen, Denmark, have invented certain new and useful Improvements in Rotary Cement-Burning Kilns, of which the following is a specification.

By the use of rotary cement burning kilns adapted to burn raw materials containing water there will, as a thermal calculation of the kiln will show when the gases have left the burning zone, the carbon-dioxide, expelling zone, and the heating zone of the kiln, always be more heat available in the gases than the heat required to evaporate the moisture contained in the raw materials. Even in case the raw materials, after wet preliminary treatment, are supplied to the kiln in shape of slurry, the gases will leave the kiln with a considerable surplus of heat.

Various methods of utilizing this surplus of heat in the gases have been proposed, for instance to dry a surplus of raw material in the kiln, and to remove this surplus material in order to burn it in a separate kiln, to divert a quantity of combustion gases corresponding to the surplus quantity of heat by way of suitably located openings in the wall of the kiln, or to cut the kiln in two between its burning zone and its smoke discharge end, and to insert at this point a flue passing a boiler plant or the like which may utilize the surplus heat.

A drawback common to these methods is that they involve a complication of the plant. The first mentioned method causes the plant to be quite costly, inasmuch as two kilns are required, and the second and third methods involve the drawback that tightenings must be used at the passage from the rotary kiln proper to the stationary parts adapted to catch the gases and direct them from the kiln into the flue for the diverted gases, or from the burning zone of the kiln into the drying zone of the same, respectively. Such tightenings involve great technical difficulties.

The present invention supplies a solution of the problem by which the above mentioned surplus heat becomes easily accessible for various uses in a manner giving a quite simple and cheap plant and, furthermore, obviating the tightening difficulties and accompanying losses due to entrance of false air, which are, as mentioned above, the principal drawbacks of the known methods.

According to the present invention the problem is solved by keeping a certain quantity of the smoke, otherwise in contact with the moist raw-material in the kiln, apart from the said material and the remaining quantity of the smoke on a certain length of the kiln situated between its burning-zone and its feeding-end (outlet of combustion-gases). Thereby it will be obtained that the portion of the smoke, kept apart from the raw material and the remaining portion of the smoke will remain dry and leave the kiln at a higher temperature than in the case of previous kiln-constructions, while obviously the remaining portion of the smoke which continues its passage in contact with the moist material, will be cooled gradually down and absorb more moisture per unit of volume than it would, in case no portion of the smoke had been diverted from contact with the moist raw material.

In order to carry this principle into effect, according to which a certain quantity of smoke is separated from the remainder, there may be inserted, in the portion of the kiln above mentioned, one or more tubes encircled by the kiln, for instance a centrally disposed tube by way of which the separated portion of the combustion gases the temperature of which is desired to be maintained high, is diverted, while the raw material and the remaining portion of the combustion gases are allowed to pass outside of this or these special flues, perhaps through special closed tubes disposed inside of the shell of the kiln.

By extending the said flue or flues for the diverted gases beyond the supply-end of the kiln, and by continuing it or them to the place where the gases are to be utitlized, any division of the kiln or openings in the shell of the latter for discharge of smoke, and corresponding stationary parts with tightenings against the kiln will be entirely avoided.

By inserting, at a suitable point in the separate flue, a suction device it becomes practicable to divert from the kiln exactly the quantity of gases (heat) needed for desired purpose, so that only exactly the necessary quantity of gases (heat) remains at disposal for drying the raw material. The smoke temperature in the chimney may therefore be reduced down to the limit determined by condensation of steam or sulphurous acid in the chimney, and the kiln may therefore be made to work in fully rational manner and economically at all outputs.

The separated gases may be improved by admixture, within or outside the kiln proper, of solid or fluid fuel which will further increase the temperature of the gases by giving off gas to be subsequently burnt. The combustion of the gas thus developed may be effected at any desired place by supplying air to the smoke at the said place.

The here described longitudinal division of the kiln is not to be confounded with the so-called cross-insertions, i. e., division of the cross-section by means of longitudinal partitions in such a manner that all of these compartments of the cross-section are passed by the flow of material as well as by the gases, the object of this arrangement is quite another one, namely to increase the surface offered by the kiln wall to the raw material in order to attain, thereby, a more efficient desiccation of the latter (evaporation of moisture).

One construction of a kiln plant arranged in accordance with the present process is illustrated in outline on the drawing, where—

Figure 2:
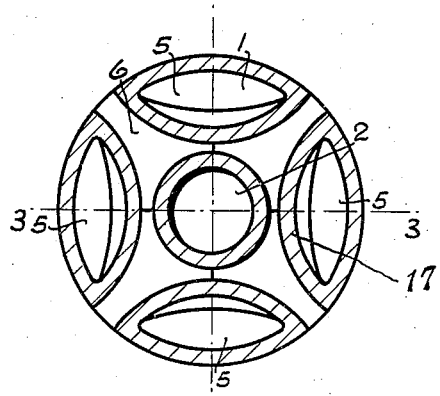
Figure 3:
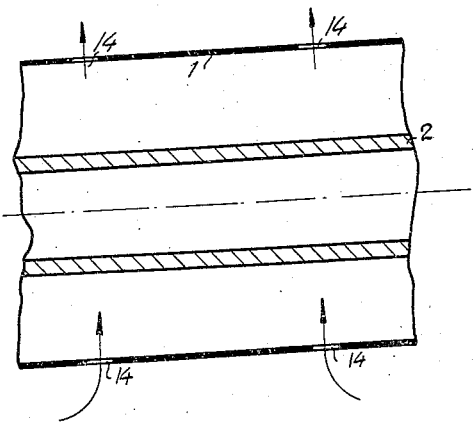

Fig. 1 shows a longitudinal section of the smoke discharge end of the kiln and a boiler plant belonging thereto, and Figs. 2 and 3, respectively, show a cross-section of the kiln along the line II—II in Fig. 1, and a longitudinal section of the same along the line III—III in Fig. 2.

In the smoke-discharge end of the kiln, the space inside of the kiln shell 1, in this construction is subdivided, by inserted iron partitions lined with fireproof material, into five tubes, one of which, the interior centrally disposed tube 2, projects out from the end of the kiln through the usual dust chamber 3, and opens into another dust chamber 4. The other four tubes 5 are grouped outside of this tube, a space 6 closed at both ends of the system of tubes by means of walls 7 being left free between all the tubes.

Through the centrally disposed tube 2, the portion of the smoke to be utilized is discharged and, in the construction of the plant shown, directed through the dust chamber 4 to a boiler 8 and thence, through an economizer 9 and a suction pan 10, to a special compartment 11 in the chimney. The suction pan serves, as mentioned above, to regulate the quantity of smoke directed through the tube 2 and the boiler plant.

The outer tubes 5 afford passage partly for the remaining portion of the smoke, which escapes by way of the dust chamber 3, to a compartment 12 of the chimney, and partly—in opposite direction—to the slurry, which is introduced into the kiln by way of a duct 13.

In the shell of the kiln openings 14 are arranged for the outer air, which will circulate through these holes to the space 6 between the tubes 2 and 5 and, thereby, prevent the tubes 17 from becoming overheated and burnt. The kiln is supported, as usual, on a ring 15 with rollers 16.

In order that the central tube 2, the temperature of which is far higher than the temperature of the outer tubes 5 may expand freely, only its inner end (to the left) is firmly connected to the outer tubes and, thereby to the kiln shell, while its outer end (to the right) may freely slide between the the outer tubes.

Instead of the separated smoke being directed through the central tube 2, and the remaining smoke and the slurry through the outer tubes 5, the tubes may be used in opposite manner, the slurry duct 13 being then directed into the tube 2, and the boiler plant 8 being connected to the duct chamber 3 instead of to the chamber 4.

It will be seen, furthermore, that one or more of the tubes, for instance the tube 2, may very well be stationary and extend from the outside into the kiln, instead of vice versa, and thus not partake of the rotation of the kiln.

Finally it may be noted that in the construction shown only two additional tightenings being easy to construct and not causing any inconveniences are introduced, namely the tightening between the smoke tube 2 and an outer end wall 7 (to the right), and the tightening between the smoke tube 2 and the partition between the chambers 3 and 4.

Having now particularly described and ascertained the nature of our said invention and in what manner the same is to be performed, we declare that what we claim is:—

1. In a rotary kiln, a plurality of tubes open at both ends extending lengthwise of the kiln and of less length than the kiln arranged about a central tube adapted to serve as a flue for products of combustion from the burning zone of the kiln, means for drawing said products of combustion through said flue, the tubes surrounding the central flue having their upper ends in communication inside a chamber surrounding the central tube, said chamber being provided with an outlet for volatile products independent of the flue, and means for supplying material to be treated to the upper ends of said surrounding tubes.

2. In a rotary kiln having a chamber formed in its upper end, a plurality of tubes open at both ends extending lengthwise of the kiln and of less length than the kiln, arranged about a central tube adapted to serve as a flue for products of combustion from the burning zone of the kiln, and extending through said chamber, means for drawing said products of combustion through said flue, the tubes surrounding the central flue having their upper ends in communication inside a chamber provided with an outlet in communication with said first chamber, an outlet for volatile products from said chamber independent of the flue, and means for supplying material to be treated to the upper ends of said surrounding tubes.

In testimony whereof we affix our signatures, December 11, 1922.

MIKAEL VOGEL-JÖRGENSEN.
KRISTIAN MIDDELBOE.

Witness:
GILBERT ASK.